US00RE48470E

(19) United States
(12) Reissued Patent
Valiyambath Krishnan et al.

(10) Patent Number: US RE48,470 E
(45) Date of Reissued Patent: Mar. 16, 2021

(54) GARMENT STEAMING DEVICE

(71) Applicant: KONINKLIJKE PHILIPS N.V., Eindhoven (NL)

(72) Inventors: Mohankumar Valiyambath Krishnan, Singapore (SG); Yongyuan Shan, Singapore (SG); Yong Jiang, Singapore (SG); Chee Keong Ong, Singapore (SG); Maarten Theodoor Henric Pelgrim, Utrecht (NL); Boon Khian Ching, Singapore (SG); Gary Chi Yang Lim, Singapore (SG); Asok Kumar Kasevan, Johor (MY)

(73) Assignee: KONINKLIJKE PHILIPS N.V., Eindhoven (NL)

(21) Appl. No.: 16/359,085

(22) Filed: Mar. 20, 2019

Related U.S. Patent Documents

Reissue of:
(64) Patent No.: 9,598,813
Issued: Mar. 21, 2017
Appl. No.: 14/758,340
PCT Filed: Dec. 23, 2013
PCT No.: PCT/IB2013/061284
§ 371 (c)(1),
(2) Date: Jun. 29, 2015
PCT Pub. No.: WO2014/106793
PCT Pub. Date: Jul. 10, 2014

U.S. Applications:
(60) Provisional application No. 61/748,263, filed on Jan. 2, 2013, provisional application No. 61/889,069, filed
(Continued)

(51) Int. Cl.
*D06F 75/10* (2006.01)
*D06F 75/14* (2006.01)
*D06F 75/26* (2006.01)

(52) U.S. Cl.
CPC ..... *D06F 75/10* (2013.01); *D06F 75/14* (2013.01); *D06F 75/26* (2013.01)

(58) Field of Classification Search
CPC ..... D06F 75/10; D06F 75/14; D06F 75/26
See application file for complete search history.

(56) References Cited

U.S. PATENT DOCUMENTS 2,316,907 A * 4/1943 Wallace ..... D06F 75/12 236/92 R
2,861,365 A * 11/1958 Block ..... A63H 33/30 219/245

(Continued)

FOREIGN PATENT DOCUMENTS

EP 1983097 A1 10/2008
GB 647586 A 12/1950

(Continued)

*Primary Examiner* — Terrence R Till

(57) ABSTRACT

A garment steaming device includes a steam generator (20) having a heater (22) and an ironing surface (32) against which a fabric of a garment is locatable. An intermediate section (50) is disposed between the steam generator and the ironing surface to transfer heat from the steam generator to the ironing surface so that the ironing surface is indirectly heated by the steam generator via the intermediate section. The operating temperature of the ironing surface is not user selectable during use. Furthermore, the intermediate section is configured to have a thermal transmittance so that, during use, heat transfer from the steam generator to the ironing surface is controlled and the temperature of the ironing surface is maintained between 90° C. and 155° C. when the ironing surface is located against a fabric in each of a stationary condition and a moving condition.

26 Claims, 4 Drawing Sheets

Related U.S. Application Data on Oct. 10, 2013, provisional application No. 61/903,496, filed on Nov. 13, 2013.

(56) References Cited

U.S. PATENT DOCUMENTS

| | | | | | |
|---|---|---|---|---|---|
| 3,110,975 | A * | 11/1963 | Kircher | D06F 75/18 | 38/77.7 |
| 3,274,714 | A * | 9/1966 | Abraham | D06F 75/14 | 38/77.83 |
| 4,939,342 | A * | 7/1990 | Frens | D06F 75/16 | 219/251 |
| 5,642,579 | A * | 7/1997 | Netten | D06F 75/18 | 38/77.7 |
| 6,122,849 | A * | 9/2000 | Kida | D06F 75/38 | 38/93 |
| 6,385,873 | B1 | 5/2002 | Probst | | |
| 7,389,597 | B1 * | 6/2008 | Chen | D06F 75/20 | 38/77.83 |
| 7,607,246 | B2 | 10/2009 | Valiyambath Krishnan | | |
| 7,721,474 | B2 | 5/2010 | Jiang | | |
| 8,166,681 | B2 | 5/2012 | Janakiraman | | |
| 8,443,532 | B2 | 5/2013 | Ong | | |
| 8,641,388 | B2 | 2/2014 | Mandica | | |
| 2005/0040153 | A1 | 2/2005 | Albandoz Ruiz De Ocenda | | |
| 2008/0189993 | A1 | 8/2008 | Cavada | | |
| 2009/0166348 | A1 | 7/2009 | Cai | | |
| 2010/0037495 | A1 * | 2/2010 | Rosenzweig | A47L 11/34 | 38/77.8 |

FOREIGN PATENT DOCUMENTS

| | | | | |
|---|---|---|---|---|
| GB | 1203145 | A | 8/1970 | |
| JP | 63309300 | A | 12/1988 | |
| JP | 523498 | A | 2/1993 | |
| JP | 5177099 | A | 7/1993 | |
| JP | 6121899 | A | 5/1994 | |
| JP | 11309299 | A | 11/1999 | |
| JP | 2002166100 | A | 6/2002 | |
| WO | 9850836 | A1 | 11/1998 | |
| WO | 2008034693 | | 3/2008 | |
| WO | WO2012085746 | A1 * | 6/2012 | |
| WO | WO-2012137095 | A1 * | 10/2012 | D06F 75/14 |

* cited by examiner

GARMENT STEAMING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is the U.S. National Phase application under 35 U.S.C. § 371 of International Application No. PCT/IB2013/061284, filed on Dec. 23, 2013, which claims the benefit of U.S. Provisional Application No. 61/748,263 filed on Jan. 2, 2013 and U.S. Provisional Application No. 61/889,069 filed on Oct. 10, 2013 and U.S. Provisional Application No. 61/903,496 filed on Nov. 13, 2013. These applications are hereby incorporated by reference herein.

FIELD OF THE INVENTION

The present application relates to a garment steaming device. The present application also relates to a steam iron or a steamer, and a method of operating a garment steaming device.

BACKGROUND OF THE INVENTION

Garment steaming devices, such as steam irons or hand-held steamers are used to remove creases from fabric, such as clothes and bedding. Such a steam iron or hand-held steamer generally comprises a main body with a handle which is held by a user, and has an ironing plate with a planar ironing surface which is pressed or located against the fabric of a garment. A water receiving chamber and a steam generator are disposed in the main body, so that water is fed from the water receiving chamber to the steam generator and converted into steam. The steam is then discharged from the steam generator through vent holes in the ironing surface towards the fabric of a garment. The steam is used to heat up and momentarily moisten the fabric of the garment in an attempt to obtain effective removal of creases from the fabric.

In a garment steaming device as described above, the ironing surface is heated to a high temperature which heats up the garment and enhances the conversion of water into steam. However, the hot ironing surface may also over heat the garment and cause undesired consequences such as shine or deformation.

SUMMARY OF THE INVENTION

It is an object of the invention to provide a garment steaming device which substantially alleviates or overcomes the problems mentioned above, among others.

The invention is defined by the independent claims; the dependent claims define advantageous embodiments.

According to the present invention, there is provided a garment steaming device comprising a steam generator having a heater, an ironing surface against which a fabric of a garment is locatable, and an intermediate section disposed between the steam generator and the ironing surface to transfer heat from the steam generator to the ironing surface so that the ironing surface is indirectly heated by the steam generator via the intermediate section, wherein the operating temperature of the ironing surface is not user selectable during use and the intermediate section is configured to have a thermal transmittance so that, during use, heat transfer from the steam generator to the ironing surface is controlled and the temperature of the ironing surface is maintained between 90° C. and 155° C. when the ironing surface is located against a fabric in each of a stationary condition and a moving condition.

With this arrangement, it is possible to use a single heating means to maintain the steam generator at a high temperature to allow a desired steam flow rate produced by the steam generator, whilst also maintaining the temperature of the ironing surface within a predetermined range when the ironing surface is in contact with a fabric of a garment to prevent the fabric from becoming overheated and causing undesired consequences such as shine or deformation of a fabric, as well as preventing condensation from forming on the fabric.

The product of the thermal transmittance of the intermediate section and the temperature differential between the steam generator and the ironing surface may be less than or equal to 1250 W/m2 when the temperature of the ironing surface is 145° C. and the ironing surface is located against a fabric in the stationary condition.

This means that, when the garment steaming device is disposed stationary against a fabric, the rate of heat transfer from the steam generator to the ironing surface is comparative to or less than the rate of heat loss from the ironing surface to the fabric when the temperature of the ironing surface is about 145° C. Therefore, the temperature of the ironing surface stabilises and does not increase above a threshold level at which the fabric would be damaged.

The product of the thermal transmittance of the intermediate section and the temperature differential between the steam generator and the ironing surface may be greater than or equal to 5500 W/m2 when the temperature of the ironing surface is 100° C. and the ironing surface is located against a fabric in the moving condition. Therefore, the fabric is restricted from becoming wet due to steam produced by the steam generator condensing during use of the garment steaming device.

This means that, when the garment steaming device is moved over a fabric, the rate of heat transfer from the steam generator to the ironing surface is comparative to or more than the rate of heat loss from the ironing surface to the fabric when the temperature of the ironing surface is about 100° C. Therefore, the temperature of the ironing surface stabilises and does not drop below a threshold level at which condensation may form on the fabric.

In one embodiment, the product of the thermal transmittance of the intermediate section and the temperature differential between the steam generator and the ironing surface is less than or equal to 1250 W/m2 when the temperature of the ironing surface is 145° C. and the ironing surface is located against a fabric in the stationary condition; and the product of the thermal transmittance of the intermediate section and the temperature differential between the steam generator and the ironing surface is greater than or equal to 5500 W/m2 when the temperature of the ironing surface is 100° C. and the ironing surface is located against a fabric in the moving condition.

It will be appreciated that the combination of the above threshold characteristics provides a synergistic effect to ensure that the heat transfer from the ironing surface to a fabric is maintained within certain parameters. This enables the ironing surface to be maintained within both predetermined upper and lower threshold values to prevent damage to a majority of fabrics and restricting a fabric from becoming wet due to steam produced by the steam generator condensing during use of the garment steaming device, whilst maintaining a sufficiently high temperature of the steam generator to ensure that a desired steam flow rate is able to be produced by the steam generator at all times.

The steam generator may be configured to generate steam at a rate of greater than or equal to 20 g/min, and more preferably greater than or equal to 30 g/min. Therefore, a sufficient flow rate of steam is produced to remove creases from fabrics when the temperature of the ironing surface is minimised According to one or more embodiments, the thermal transmittance may be between 75 $W/m^2K$ and 125 $W/m^2K$, and preferably between 90 $W/m^2K$ and 110 $W/m^2K$.

The temperature of the ironing surface may be maintained between 100° C. and 145° C. when the ironing surface is located against a fabric in each of a stationary condition and a moving condition.

This means that the temperature of the ironing surface is maintained above a threshold temperature to restrict a fabric from becoming wet due to steam produced by the steam generator condensing during use of the garment steaming device, but below a threshold temperature to minimise the potential for damage to a fabric.

The steam generator may be configured to operate at a temperature between 140° C. and 170° C., and preferably between 150° C. and 160° C.

This means that the steam generator is able to maintain a sufficiently high temperature to ensure that a desired steam flow rate is produced by the steam generator.

The garment steaming device may further comprise a sensor configured to determine the operating condition of the garment steaming device, and a controller, wherein the controller may be configured to operate the heater to maintain the steam generator at a first temperature range when a first operating condition is determined and a second temperature range when a second operating condition is determined.

Therefore, it is possible to operate the heater in at least two different states dependent on the operating condition of the garment steaming device. With such an arrangement it is possible to increase the operating temperature of the steam generator when the garment steaming device is being used to press a fabric without exceeding the desired operating temperature of the ironing surface.

The sensor may be a motion sensor and the controller may be configured to operate the heater to maintain the steam generator at a first temperature range when no motion of the garment steaming device is detected by the motion sensor, and to operate the heater to maintain the steam generator at a second temperature range when motion of the garment steaming device is detected by the motion sensor.

This means that it is possible for the heater to be operated in dependence on whether movement of the garment steaming device is determined. Therefore, it is possible to determine whether the device is stationary on a fabric, or is being moved over a fabric. The heat loss from the ironing surface will increase when the ironing surface is moved over a fabric compared to when the ironing surface is stationary on a fabric. This means that it is possible to operate the steam generator at different temperature ranges in dependence on the movement condition detected by the motion sensor to ensure that the ironing surface is maintained within desired threshold values.

The first temperature range may be between 140° C. and 170° C., and the second temperature range may be between 160° C. and 190° C.

An advantage of the above temperature ranges is that it is possible to maximise the steam rate and minimise or eliminate the occurrence of spitting and/or water leakage whilst still maintaining the temperature of the ironing surface below a desired operating temperature to prevent overheating of a fabric in contact with the ironing surface.

The plate may be a metal, metal alloy or a thermally conductive polymer. The plate may be a Mica sheet.

According to one or more embodiments, the intermediate section may comprise a variable heat conductivity material.

Therefore, an intermediate section having a variable thermal transmittance may be easily produced.

The intermediate section may be formed from a layer of variable heat conductivity material.

The thermal conductivity of the variable heat conductivity material is configured to vary by at least 100% over a temperature change of the variable heat conductivity material of 50° C.

With this arrangement it is possible to maximise the operating temperature of the steam generator whilst ensuring that the temperature of the ironing surface is maintained between 90° C. and 155° C.

The thermal transmittance of the variable heat conductivity material may be configured to vary by at least 100% when the ironing surface temperature changes between 100° C. and 145° C.

With this arrangement the variable heat conductivity material helps to ensure that the temperature of the ironing surface is maintained between 90° C. and 155° C., whilst allowing for fluctuations in the temperature of the steam generator.

The steam generator may be configured to operate at a temperature of greater than or equal to 160° C.

This helps to maximise the steam rate without spitting and condensation occurring.

The steam generator may be configured to operate at a temperature of less than or equal to 250° C.

This helps to ensure that the reliability of the steam generator is maintained by not operating at an excessive temperature.

The thermal transmittance of the intermediate section may be configured to be less than or equal to 36 $W/m^2K$ when the ironing surface temperature is 145° C.

The above parameters of the intermediate section helps to ensure that the temperature of the ironing surface does not exceed the upper threshold temperature of 155° C. whilst maintaining a high operating temperature of the steam generator, irrespective of the operating condition of the ironing surface, and so will not damage a fabric.

The thermal transmittance of the intermediate section is configured to be greater than or equal to 42 $W/m^2K$ when the ironing surface temperature is 100° C.

The above parameters of the intermediate section helps to ensure that the temperature of the ironing surface does not drop lower than the lower threshold temperature of 90° C. whilst maintaining a high operating temperature of the steam generator, irrespective of the operating condition of the ironing surface, and so will not allow condensation to form on a fabric during use.

In one embodiment, the thermal transmittance of the intermediate section is configured to be less than or equal to 36 $W/m^2K$ when the ironing surface temperature is 145° C., and greater than or equal to 42 $W/m^2K$ when the ironing surface temperature is 100° C., and wherein the thermal transmittance is configured to vary by at least 100%.

It will be appreciated that the combination of the above characteristics of the variable thermal transmittance of the intermediate section provides a synergistic effect to ensure that the heat transfer from the ironing surface to a fabric is maintained within certain parameters. This enables the ironing surface to be maintained within both predetermined upper and lower threshold values to prevent damage to a majority of fabrics and restricting a fabric from becoming wet due to steam produced by the steam generator condensing during use of the garment steaming device, whilst maintaining a sufficiently high temperature of the steam generator to ensure that a desired steam flow rate is able to be produced by the steam generator at all times.

At least part of the intermediate section may be integrally formed with the steam generator and/or the ironing surface. This means that ease of manufacturing and assembly is maximised.

The intermediate section may be formed from a single material, a composite material, or a combination of two or more materials.

The intermediate section may comprise a body having at least one cavity containing a phase change material. The phase change material may be in one phase which will enable high thermal transmittance when the ironing surface temperature is low, for example, at 100° C. The phase change material will be in another phase which will enable low thermal transmittance when the ironing surface temperature is high, for example, at 145° C.

The intermediate section may comprise an intermediate layer configured to act as a thermal buffer to store heat from the steam generator and/or to act as a heat distributor to distribute heat to the ironing surface. Therefore, heat from the steam generator is able to be redistributed more evenly over an ironing surface of the ironing plate.

The intermediate layer may form a steam channel extending along the layer along which steam from the steam generator is able to flow.

With this arrangement the steam channel provides a pathway to guide steam along the intermediate layer. Therefore, the surface area of the intermediate layer in contact with steam is maximised. As a result, the temperature of the intermediate layer, and therefore the ironing surface, is able to be increased at a higher rate, particularly under demanding heat transfer situations. Therefore, the ironing surface is able to be heated to its operating temperature at an increased rate.

Furthermore, channeling steam about the intermediate layer minimises water leakage from the steam iron as any condensate or supplied water that has not been converted to steam gets heated up along the steam path provided.

The steam channel may be formed in an upper face of the intermediate layer. With this arrangement, the steam channel is exposed to a face of the steam generator. Therefore, heat transfer from the steam generator to fluid in the steam channel is maximised.

The steam channel may be formed in a lower face of the intermediate layer. Therefore, the steam is able to transfer heat to the ironing surface more effectively.

An opening may be formed through the intermediate layer to define a steam path along which steam is able to flow from the steam generator to the ironing surface. This means that a path along which steam is able to flow from the steam generator to the ironing plate is easily provided.

A steam path may be defined around the intermediate layer along which steam is able to flow from the steam generator to the ironing plate. Therefore, it is possible to minimise or eliminate the need to provide openings through the intermediate layer.

The intermediate layer may extend to or over the footprint of the steam generator. The intermediate layer may also extend to or over the footprint of the ironing surface.

The intermediate layer may be an intermediate plate received between the steam generator and the ironing surface. Therefore, the intermediate layer may be easily formed.

The intermediate layer may be a first intermediate layer and the intermediate section may comprise a second and further intermediate layers. The intermediate layers may have differing thermal properties. The differing thermal properties may include heat capacity and thermal conductivity. For example, in one embodiment one intermediate layer may be formed from a plate, such as a Mica sheet, whereas another intermediate layer may be an air gap provided between the Mica sheet and one of the steam generator or ironing plate. Therefore, it is possible to increase the ease of obtaining the desired thermal properties.

At least one intermediate layer may be an air gap disposed between the steam generator and the ironing plate.

Steam produced by the steam generator may be receivable in the air gap. Therefore, the means for steam to be distributed along the air gap to steam holes in the ironing surface is simplified.

According to another aspect of the invention, there is provided a garment steaming device comprising a steam generator having a heater, a motion sensor configured to detect the operating condition of the garment steaming device, and a controller, wherein the controller is configured to operate the heater to maintain the steam generator at a first temperature range when no motion of the garment steaming device is detected by the motion sensor, and a second temperature range when motion of the garment steaming device is detected by the motion sensor.

An advantage of using a motion sensor is that the heat transfer from the steam generator to the ironing surface can be adjusted automatically to compensate for the difference in heat loss from the ironing surface to a fabric when the ironing surface is moved over a fabric compared to when the ironing surface is stationary on a fabric.

The garment steaming device may be a steam iron, a cold water system iron or a garment steamer.

According to another aspect of the invention, there is provided a method of operating a garment steaming device having a steam generator with a heater, and a motion sensor configured to detect the operating condition of the garment steaming device, the method comprising operating the heater to maintain the steam generator at a first temperature range when no motion of the garment steaming device is detected by the motion sensor, and operating the heater to maintain the steam generator at a second temperature range when motion of the garment steaming device is detected by the motion sensor.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
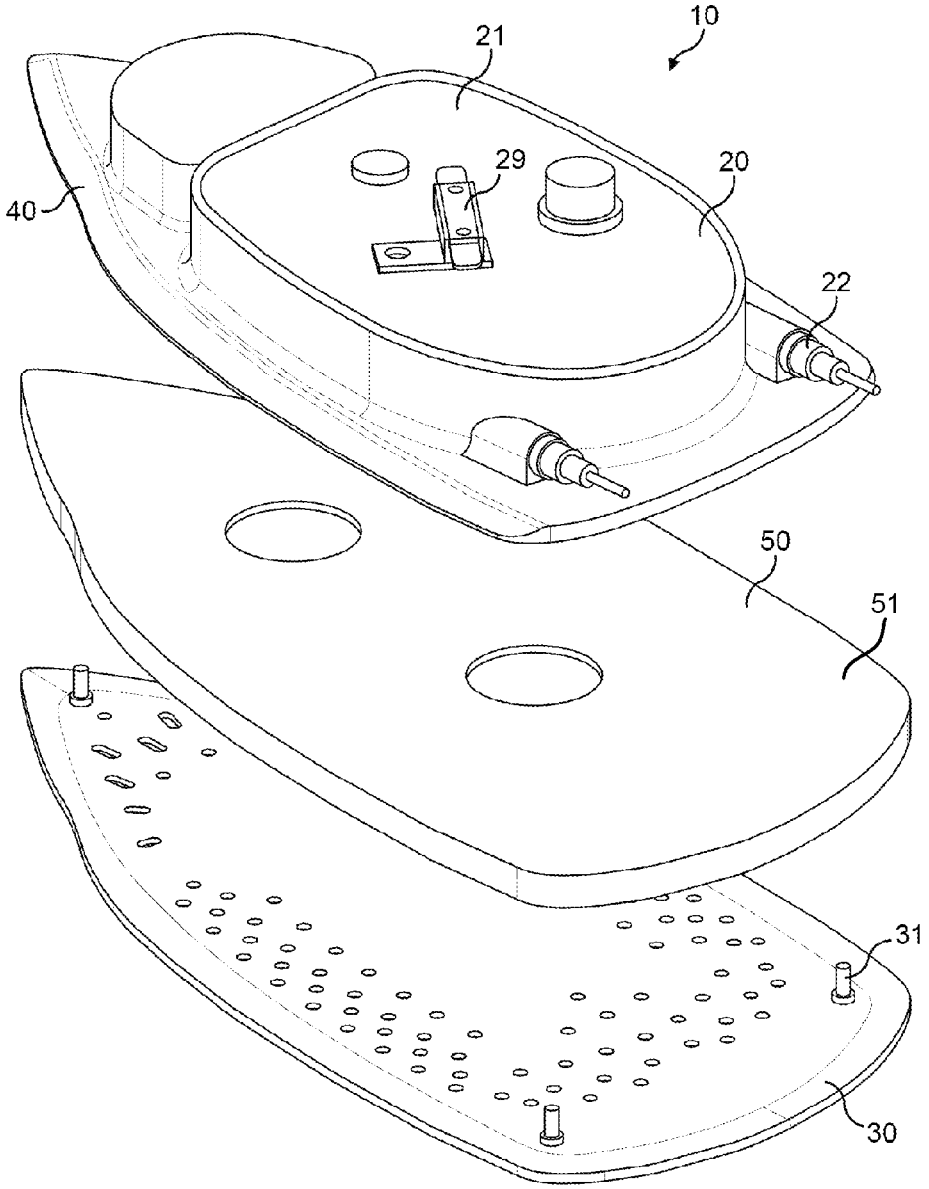
FIG. 1 shows an exploded perspective view of a heating assembly for a steam iron.
Figure 2:
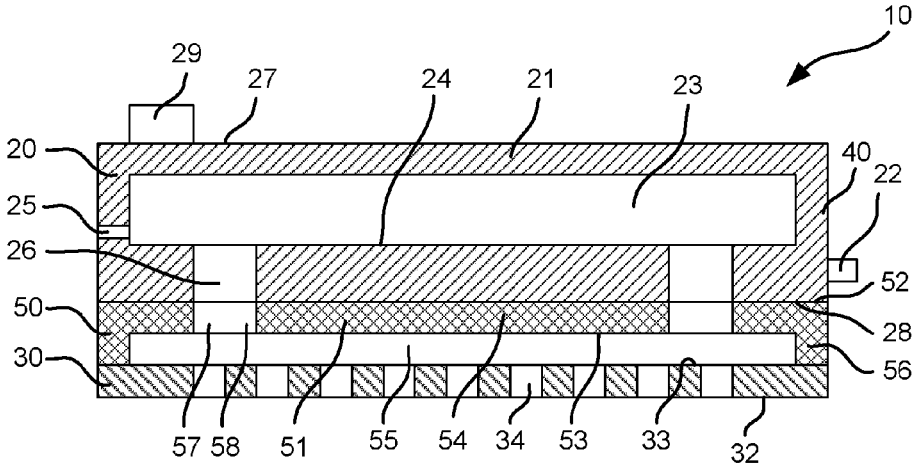
FIG. 2 shows a diagrammatic cross-sectional view of the heating assembly shown in FIG. 1.

Referring now to FIG. 1 and FIG. 2, a heating assembly 10 of a steam iron is shown. Such a steam iron is generally used to apply steam to a fabric of a garment to remove creases from the fabric. The steam iron acts as a garment steaming device. Although in the embodiments described below the garment steaming device is a steam iron, it will be understood that the invention is not limited thereto and that the invention may relate to other types of garment steaming devices, such as a hand-held garment steamer or the like. Furthermore, although the embodiments described below will relate to applying steam to the fabric of a garment, it will be appreciated that such a steam iron may be used to remove creases from other fabrics.

The steam iron comprises a housing (not shown) and a handle (not shown). The handle is integrally formed with the housing, and is gripped by a user during use of the iron to enable a user to manoeuvre and position the steam iron.

The heating assembly 10 is received by the housing (not shown). The heating assembly 10 comprises a steam generator 20 and an ironing plate 30. The steam generator 20 is received by a sole plate 40. The steam generator 20 may be integrally formed with the sole plate 40.

Figure 3:
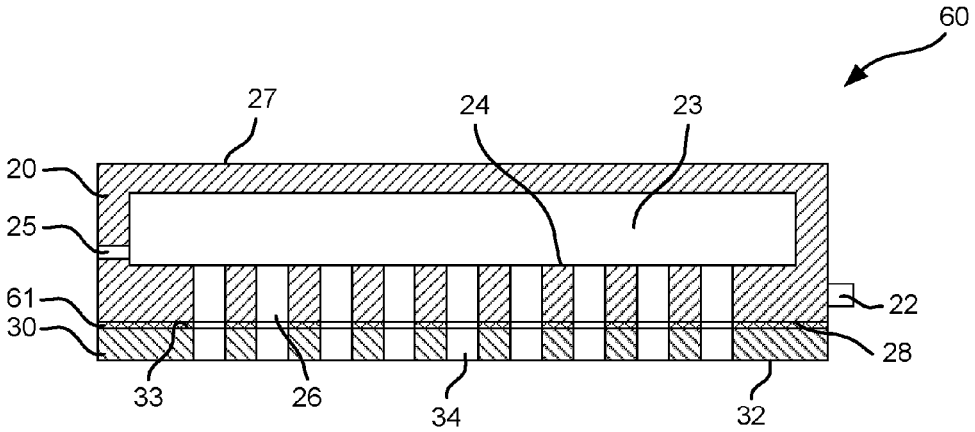
FIG. 3 shows a diagrammatic cross-sectional view of another embodiment of a heating assembly for a steam iron.

The steam generator 20 comprises a body 21 and a heater 22. The heater 22 is received in the body 21. The heater 22 is integrally formed in the body 21. The heater 22 extends longitudinally along the body 21 (only an end extending from the body is shown in FIG. 2 and FIG. 3). The body 21 is formed from a heat conductive material, such as cast aluminium. Therefore, the body 21 is heated when the heater 22 is operated. That is, heat is conducted from the heater 22 to raise the temperature of the body 21 of the steam generator 20. The steam generator 20 has a steam generating chamber 23. The steam generating chamber 23 is defined by the body 21. An inner surface 24 of the body 21 defines a heated surface of the steam generating chamber 23.

The steam generating chamber 23 has a fluid inlet 25 and a steam outlet 26. The fluid inlet 25 provides a passageway to supply water to the steam generating chamber 23. The steam outlet 26 provides a passageway to feed steam from the steam generating chamber 23. The steam outlet 26 is formed by one or more passages extending through the body 21 of the steam generator 20.

A water receiving chamber (not shown) is disposed in the housing. Water is stored in the water receiving chamber and is fed to the fluid inlet 25. A fluid passageway (not shown) communicates between the water receiving chamber and the steam generating chamber 23 so that water in the water receiving chamber is able to flow into the steam generating chamber 23 through the fluid inlet 25. A valve (not shown), such as a needle valve, is disposed in the fluid passageway to control the flow of water from the water receiving chamber into the steam generating chamber 23.

The steam generator 20 has an upper side 27 and a lower side 28. A temperature sensor 29 communicates with the upper side 27. The temperature sensor 29 is mounted to the upper side 27 of the steam generator 20. The temperature sensor 29 is operable to detect the temperature of the steam generator 20. The temperature sensor 29 is connected to a controller (not shown). The controller is operable to determine the temperature of the steam generator 20 in response to a signal received from the temperature sensor 29. The controller is operable to control operation of the heater 22 to maintain the temperature of the steam generator 20 within a predetermined range. That is, when the steam iron is operated, the controller is operable to turn the heater 22 on and off in response to the determined temperature to maintain the temperature of the steam generator 20 within a desired temperature range. The temperature sensor 29 and the controller may be a thermostat which is operable to control the supply of power from a power supply (not shown) to the heater 22.

The lower side 28 of the steam generator 20 faces the ironing plate 30. The steam outlet 26 of the steam generator is formed in the lower side 28.

The ironing plate 30 has a lower surface 32 and an upper surface 33. The lower surface 32 forms an ironing surface against which a fabric is locatable. Steam holes 34 are formed through the ironing plate 30. The steam holes 34 extend to and are formed in the ironing surface 32. The steam holes 34 are distributed about the ironing surface 32. Edges of the steam holes 34 are chamfered to prevent a fabric catching on the edges when a fabric is disposed against the ironing surface. Similarly, edges of the ironing surface 32 of the ironing plate 30 are chamfered.

The upper surface 33 of the ironing plate 30 faces the steam generator 20. The upper surface 33 of the ironing plate 30 is spaced from the lower side 28 of the steam generator 20. The ironing plate 30 is disposed on one side of the housing (not shown) of the steam iron. The handle is disposed on an opposing side of the housing to the ironing surface 32. The ironing surface 32 of the ironing plate 30 is exposed to be located against a fabric to be pressed. The ironing surface 32 of the ironing plate 30 has a coating (not shown) to reduce friction.

The heating assembly 10 further comprises an intermediate section 50. The intermediate section 50 includes an intermediate plate 51. It will be understood that in the present arrangement that the ironing plate 30 also forms part of the intermediate section 50. The intermediate plate 51 acts as a first intermediate layer. The intermediate plate 51 is received between the steam generator 20 and the ironing plate 30, and therefore between the steam generator 20 and the ironing surface 32. The intermediate section 50 is defined between the lower side 28 of the steam generator 20 and the ironing surface 32. Attachments, for example attachment elements 31, attach the ironing plate 30 to the intermediate plate 51, and the intermediate plate 51 to the sole plate 40.

Referring to FIG. 2, the intermediate plate 51 has an upper face 52 and a lower face 53. The intermediate plate 51 is formed from a heat conductive material such as a metal, a metal alloy or a thermally conductive polymer. The upper and lower faces 52, 53 are generally planar and define a panel section 54 therebetween.

The intermediate section 50 also has a second intermediate layer. The second intermediate layer is an air gap 55. The air gap 55 extends parallel to the intermediate plate 51.

A shoulder 56 protrudes from the lower face 53 of the intermediate plate 51. The shoulder 56 acts as a spacing means. The shoulder 56 extends from the panel section 54 of the intermediate plate 51. The shoulder 56 extends around the periphery of the panel section 54. The shoulder 56 defines the air gap 55, acting as the second intermediate layer. Therefore, the air gap 55 is formed below the panel section 54 of the intermediate plate 51.

The ironing plate 30 acts as a third intermediate layer of the intermediate section 50. The intermediate section 50 is configured to have a thermal transmittance between the steam generator 20 and the ironing surface 32 as will be described below.

It will be understood that the intermediate section 50 arrangement described above is provided with first, second and third intermediate layers, namely the intermediate plate 51, the air gap 55 formed parallel, and adjacent, to the intermediate plate 51, and the ironing plate 30. However, it will be understood that the intermediate section 50 may be formed from a single intermediate layer, two intermediate layers, or four or more intermediate layers. In the present arrangement, the upper face 52 of the intermediate plate 51 is mounted to the lower side 28 of the steam generator 20.

In the present arrangement the intermediate plate 51 is formed from a discrete component thermally connected to the steam generator 20 and the ironing plate 30. However, it will be understood that alternative arrangements are envisaged. For example, in another arrangement the intermediate plate 51 is integrally formed with one or both of the steam generator 20 and the ironing plate 30, or is omitted, so that the intermediate section 50 is integrally formed with the steam generator 20 and/or the ironing surface 32. In one embodiment the intermediate section 30 is integrally formed with the steam generator. That is, the intermediate section and the steam generator form two portions of the same body. Such an integrally formed intermediate section may be formed by recesses in a body which also defines the steam generator. In an alternative arrangement, the ironing plate itself may form the intermediate section without any additional parts. In such an arrangement the ironing surface is formed by a surface of the intermediate section 50.

A steam path 57 is formed through the intermediate section 50. The steam path 57 comprises steam openings 58 formed through the intermediate plate 51. The steam openings 58 extend between the upper and lower faces 52, 53 of the intermediate plate 51. Alternatively, a single steam opening may be provided. In the present arrangement, the air gap 55 forms part of the steam path 57 provided through the intermediate layer 50. The steam path 57 provides a pathway for steam to flow from the steam generator 20 to the ironing plate 30. That is, in the present arrangement, the steam openings 58 align with the steam outlet passages in the steam generator 20 and the air gap 55 extends over the steam holes 34 in the ironing plate 30. Therefore, steam is able to flow from the steam generating chamber 23 to the steam holes 34 extending in the ironing surface 32 of the ironing plate 30.

The steam iron does not have a user selectable temperature control. That is, a user is not able to operate the steam iron to adjust the temperature of the ironing surface during use of the steam iron. A conventional steam iron is provided with a user adjustable input which enables the user to adjust the temperature of the ironing surface during use. This allows a user to set the temperature of the ironing surface dependent on the fabric to be ironed to prevent the fabric against which the ironing surface 32 is positioned from becoming overheated and causing undesired consequences such as shine or deformation of the fabric.

From experimentation it has been found that it is possible to remove creases from a normal range of fabrics used in garments by using a high steam flow rate and maintaining a low temperature of the ironing surface. This helps to prevent the ironing surface 32 from becoming overheated. Experiments have found that the heat transfer rate from an ironing surface to a fabric is substantially the same for the majority of types of fabric used to produce garments.

Experiments have found that the temperature of the ironing surface 32 should be maintained below 155° C., and preferably below 145° C., to prevent a fabric from becoming overheated and causing undesired consequences such as shine or deformation. Therefore, this provides an upper threshold temperature value for the ironing surface 32.

It has been determined that the stabilised lowest heat loss rate from the ironing surface to a fabric used in garments occurs when the temperature of the ironing plate is at the upper threshold temperature value and the ironing surface is disposed in a stationary condition. That is, the ironing surface of the steam iron is located against the same section of a fabric and is held static. For example, the heat loss rate from the ironing surface to a fabric of a garment for a 200 $cm^2$ ironing surface has been found to be 25 W when the temperature of the ironing surface is 145° C. Therefore, it has been found through experimentation that for a fabric used in a garment the stabilised lowest heat loss at a threshold temperature value of 145° C. is 1250 $W/m^2$. This means that the heat transfer rate to the ironing surface 32 should be less than or equal to 1250 $W/m^2$ when the temperature of the ironing surface is 145° C., and the ironing surface is in a stationary condition, so as to prevent the temperature of the ironing surface 32 from exceeding the higher threshold temperature value.

Experiments have also found that the temperature of the ironing surface should be maintained above 90° C., and preferably above 100° C., to prevent condensation from forming on a fabric being pressed. Therefore, this provides a lower threshold temperature value for the ironing surface.

It has been determined that the stabilised highest heat loss rate from the ironing surface to a fabric used in garments occurs when the temperature of the ironing plate is at the lower threshold temperature value and the ironing surface is disposed in a moving condition on the fabric. That is, the ironing surface of the steam iron is located against and moved over a portion of a fabric such that it is not in constant contact with the same section of the fabric. For example, the heat loss rate from the ironing surface to a fabric of a garment for a 200 $cm^2$ ironing surface has been found to be 110 W when the temperature of the ironing surface is 100° C. Therefore, it has been found through experimentation that for a fabric used in a garment the stabilised highest heat loss at a threshold temperature value of 100° C. is 5500 $W/m^2$. This means that the heat transfer rate to the ironing surface 32 should be greater than or equal to 5500 $W/m^2$ when the temperature of the ironing surface is 100° C., and the ironing surface 32 is in a moving condition, so as to prevent the temperature of the ironing surface 32 from falling below the lower threshold temperature value.

It has also been found that it is necessary to maintain a supply of steam to the fabric when the temperature of the ironing surface is maintained between 90° C. and 155° C., and preferably between 100° C. and 145° C., in order to remove creases from a range of fabrics used in garments. Therefore, it has been found that the temperature of the steam generator 20 should be maintained within said temperature range so that a constant supply of steam is generated and supplied to the ironing surface 32.

Power is supplied by a power supply unit PSU (not shown) when the steam iron, acting as a garment steaming device, is operated. The controller (not shown) is operable to control the supply of power to the heater, therefore controlling operation of the heater 22. The heater 22 is received by the body 21 of the steam generator 20, and so the steam generator 20 is heated to a desired operating condition. The controller (not shown) is operable to control operation of heater 22 to maintain the steam generator 20 at the desired operating condition. With the present arrangement, the steam generator 20 is operated at a temperature between 140° C. and 170° C., and preferably between 150° C. and 160° C. This temperature range is provided to ensure that a sufficient flow rate of steam is produced by the steam generator when water is provided to the steam generator 20 through the water inlet 25. That is, the flow rate of steam produced by the steam generator 20 should be sufficient to remove creases from a range of fabrics used in garments. In the present arrangement, the desired flow rate of steam is greater than or equal to 20 g/min, and preferably greater than or equal to 30 g/min.

The controller (not shown) controls operation of the heater 22 in dependence on the temperature detected by the temperature sensor 29 to regulate the temperature of the steam generator 20. That is, the heater 22 is operated to maintain the temperature of the steam generator 20 to enable the provision of a sufficient steam rate from the steam generator to provide adequate de-wrinkling of a fabric disposed against the ironing surface 32.

The steam generator 20 generates steam by an instant steam generation method. Water is supplied through the water inlet 25 to be converted to steam. With the steam generator 20 being operated at a temperature between 140° C. and 170° C., and preferably between 150° C. and 160° C., steam is able to be produced at a desired flow rate without excess water undesirably flowing from the steam generator 20.

The heater 22 is provided to heat both the steam generator 20 to generate steam, and to heat the ironing surface 32. Therefore, it has been found that the heater should be configured to provide a sufficient amount of heat to the steam generator 20 to ensure that a sufficient level of steam is generated by the steam generator to enable clothes to be pressed, whilst also ensuring that the transfer of heat from the steam generator 20 to the ironing plate 30 is maintained within a predetermined range to ensure that the temperature of the ironing surface 32 is maintained within the desired temperature thresholds described above.

Therefore, the intermediate section 50 is provided between the steam generator 20 and the ironing surface 32. The intermediate section 50 controls the transfer of heat from the steam generator 20 to the ironing surface 32. The intermediate section 50 acts as a thermal buffer to store heat from the steam generator. The intermediate section 50 also acts as a heat distributor to distribute heat to the ironing surface. Therefore, the ironing plate 30 is indirectly heated by the steam generator 20.

The intermediate section 50 forms a heat transfer layer between the steam generator 20 and the ironing surface 32. The intermediate section 50 provided between the steam generator 20 and the ironing surface 32 acts to control the transfer of heat from the steam generator 20 to the ironing plate 30. In particular, the intermediate section 50 restricts heat transfer by conduction from the steam generator 20 to the ironing plate 30.

Therefore, the provision of the intermediate section 50 provides for indirect heat transfer from the steam generator 20 to the ironing surface 32. Therefore, only a single heating means is required to heat both the steam generator 20 and the ironing surface 32. The ironing surface 32 is heated by heat transfer from the intermediate section 50.

The intermediate section 50 is configured to have a thermal transmittance so that, during use of the steam iron, heat transfer from the steam generator is controlled and the temperature of the ironing surface is maintained within the upper and lower threshold temperature values described above. That is, the range of the thermal transmittance of the intermediate section 50 controls the transfer of heat to the ironing surface so that the temperature of the ironing surface does not fall below a temperature at which condensation forms on a fabric, and does not exceed a temperature at which a fabric to be pressed becomes overheated and causing undesired consequences such as shine or deformation.

The thermal transmittance (h) of a section, such as a material, a composite material, or a combination of two or more materials is defined by the following equation:

$$h = \frac{Q}{A(T_{SG} - T_{IS})}$$

Wherein: h=thermal transmittance ($W/m^2K$)
Q=heat transfer rate (W)
A–area of the ironing surface ($m^2$)
$T_{SG}$=temperature of the steam generator (° C.)
$T_{IS}$=temperature of the ironing surface (° C.)

Therefore, the thermal transmittance is dependent on the heaty transfer rate, the area of the ironing surface and the temperature differential between the steam generator and the ironing surface. It will be understood that, during use, the temperature of the steam generator will be higher than the temperature of the ironing surface. The intermediate section 50 determines the transfer of heat from the steam generator 20 to the ironing surface 32. Therefore, a temperature gradient is provided between the steam generator 20 and the ironing surface 32. The intermediate section 50 also acts as an energy buffer.

With the provision of the intermediate section 50 it is possible to heat the steam generator 20 to a sufficient temperature to convert the water fed into the steam generator 20 into steam, whilst maintaining the ironing surface 32 within a predetermined temperature range. The intermediate section 50 allows the steam generator 20 to be heated to a sufficient temperature to allow a desired steam throughput from the steam generator 20, whilst maintaining the ironing surface 32 at a desired lower temperature.

In the present arrangement, the characteristics of the intermediate section 50 are configured to control the transfer of heat from the steam generator 20 to the ironing surface 32 so that the temperature of the ironing surface 32 is operated at a low ironing temperature at all times during use, that is at a temperature of less than 155° C., and preferably 145° C., and greater than 90° C., preferably 100° C., when the steam generator 20 is operated and heated at a temperature in the range of 140° C. and 170° C., and preferably between 150° C. and 160° C. It will be understood that, during use, the temperature of the steam generator will be higher than the temperature of the ironing surface.

The intermediate section 50 as shown, for example, in FIG. 2 is configured to have a thermal transmittance so that, during use, the lowest heat transfer rate from the steam generator to the ironing surface occurs when the temperature of the ironing surface 32 is at the upper threshold temperature value and the ironing surface is disposed in a stationary condition.

Therefore, when the ironing surface is in a stationary condition against a fabric, the intermediate section 50 has the characteristic of:

$$h(T_{SG1}-145)\leq 1250\ W/m^2$$

Wherein: h=thermal transmittance ($W/m^2K$)

$T_{SG1}$=temperature of the steam generator (° C.)

That is, the product of the thermal transmittance of the intermediate section and the temperature differential between the steam generator and the ironing surface is less than or equal to 1250 $W/m^2$ when the temperature of the ironing surface is 145° C. and the ironing surface is located against a fabric in the stationary condition.

The above parameters of the intermediate section 50 helps to ensure that the temperature of the ironing surface 32 does not exceed the upper threshold temperature, irrespective of the operating condition of the ironing surface, and so will not damage a fabric.

The intermediate section 50 is also configured to have a thermal transmittance so that, during use, the highest heat transfer rate from the steam generator to the ironing surface occurs when the temperature of the ironing surface 32 is at the lower threshold temperature value and the ironing surface is disposed in a moving condition.

Therefore, when the ironing surface is in a moving condition against a fabric, the intermediate section 50 has the characteristic of:

$$h(T_{SG2}-100)\geq 5500\ W/m^2$$

Wherein: h=thermal transmittance ($W/m^2K$)

$T_{SG2}$=temperature of the steam generator (° C.)

That is, the product of the thermal transmittance of the intermediate section and the temperature differential between the steam generator and the ironing surface is greater than or equal to 5500 $W/m^2$ when the temperature of the ironing surface is 100° C. and the ironing surface is located against a fabric in the moving condition.

The above parameters of the intermediate section 50 helps to ensure that the temperature of the ironing surface 32 does not drop lower than the lower threshold temperature, irrespective of the operating condition of the ironing surface, and so will not allow condensation to form on a fabric during use.

The steam generator temperature values ($T_{SG1}$ and $T_{SG2}$), as well as the thermal transmittance, h, of the intermediate section are dependent on the two inequalities discussed above. Therefore, the values of thermal transmittance of the intermediate section and the temperature ranges for operating the steam generator are determined through experimentation by reference to the inequalities given above for the ironing surface in a stationary condition against a fabric and the ironing surface in a moving condition against a fabric.

It will be understood that the temperature of the steam generator may vary, in particular between when the ironing surface is in each of a stationary and a moving condition against a fabric. Therefore, $T_{SG1}$ may not equal $T_{SG2}$.

The intermediate section 50 ensures that the temperature of the steam generator 20 is maintained within its predetermined operating temperature range to ensure that a desired quantity of supply of steam is provided to the fabric. The intermediate section 50 also ensures that when a desired flow rate of water is provided to the steam generator 20 to produce a desired steam flow rate, all the water is turned into steam without water passing through the steam outlet 26. If a quantity of water is not turned into steam, then the water may flow from the steam iron and act to dampen the fabric being pressed.

It has been found from experimentation that the combination of providing the ironing surface within the above described operating range together with providing a high steam flow rate, which is made possible by maintaining the temperature of the steam generator provides a good ironing performance for fabrics of garments.

As mentioned above, the intermediate section 50 acts as a heat distribution layer. That is, the intermediate section 50 acts to distribute a portion of the heat generated by the heater 22 of the steam generator 20 to the ironing surface 32 so that the ironing surface 32 is heated to a desired temperature range. Therefore, it is possible to use a single heater to heat both the steam generator 20 to produce steam and to heat the ironing surface 32. Furthermore, the intermediate section 50 is also provided to distribute heat evenly across the ironing surface 32 to prevent localised hot spots on the ironing surface 32. That is, the intermediate section 50 provides an even heat distribution.

The provision of the intermediate section 50 may also limit heat loss from the steam generator 20 when heat is transferred from the ironing surface 32 to the fabric of a garment being ironed. Therefore, a reduction of temperature in the steam generator 20 is restricted.

It will be understood that one arrangement of the intermediate section 50 which provides the desired characteristics is described above. With such an intermediate section 50 the parameters, such as the dimensions, of the intermediate section 50 are dependent on the characteristics of the ironing surface 32 and the steam generator 20, for example the size of the ironing surface 32, the steam generator 20, the contact area between the intermediate section 50 and the steam generator 20 and the contact area with the ironing plate 30. However, it will be understood that the parameters of the intermediate section may be easily determined in order to provide the desired characteristics of the intermediate section.

In the present arrangement, the intermediate section 50 extends across the footprint of the steam generator 20. In such an arrangement the steam path 57 from the steam generator to the ironing surface is formed through the intermediate section 50. However, in an alternative arrangement the intermediate section 50 may only partially extend across the footprint of the steam generator 20. In such an arrangement, the intermediate section does not extend across the footprint of the ironing surface 32. A steam path is provided around the intermediate section to allow steam to pass from the steam generator 20 to the ironing surface 32.

In the above described embodiments, the intermediate section 50 is formed by the intermediate plate 51 together with the air gap 55 forming first and second intermediate layers respectively. However, in an alternative embodiment, the air gap is omitted. With such an arrangement, the intermediate plate 51 forms the intermediate section. One or more steam openings are formed through the intermediate plate 51 to form a steam path from the steam generator 20 to the steam holes 34 in the ironing surface 32. Alternatively, a steam path is provided around the intermediate plate 51 to allow steam to pass from the steam generator 20 to the steam holes 34 extending through the ironing surface 32.

It will be understood that the intermediate section may be formed from two or more intermediate layers, such as a layer of a metal alloy and a layer of a heat conductive polymer. In an alternative arrangement, the intermediate plate, acting as a first intermediate layer, defines a cavity in which a phase-change material is received to act as a second intermediate layer.

It will also be understood that the intermediate section disposed between the steam generator and the ironing plate may comprise more than two intermediate layers to obtain the desired temperature gradient between the steam generator and the ironing surface.

In an alternative arrangement, an air gap, forming an intermediate layer of the intermediate section may be formed on the upper side of the intermediate plate 51. With such an arrangement, the lower face 53 of the intermediate plate 51 is mounted to the ironing plate 30 and the shoulder 56 mounts against the lower side 28 of the steam generator 20.

Referring to FIG. 3, another embodiment of a heating assembly 60 of a steam iron is shown. The heating assembly 60 shown in FIG. 3 generally has the same arrangement as the heating assembly 10 described above with reference to FIG. 1 and FIG. 2. Therefore, a detailed description will be omitted herein. Features and components that correspond to features and components described above will retain the same reference numerals for each of reference. However, in this embodiment an intermediate section comprises a layer of thermal paste acting as an intermediate layer 61 provided between the lower side 28 of the steam generator 20 and the upper surface 33 of the ironing plate 30. In such an arrangement, the openings forming the steam outlets 26 of the steam generator 20 are aligned with the steam holes 34 in the ironing surface 32. Although in this embodiment the intermediate section comprises a layer of thermal paste acting as an intermediate layer 61, it will be understood that the intermediate layer 61 may be formed from alternative materials to enable the intermediate section to have the desired thermal transmittance.

In the above described embodiments, it will be understood that the heater 22 is operated in one operating condition to maintain the temperature of the steam generator 20 within a predetermined temperature range. With this arrangement, the temperature of the steam generator 20 is not user controllable, which simplifies operation of the steam iron. Furthermore, it is not necessary for a user to adjust the temperature of the ironing surface dependent on the fabric to be ironed because the ironing surface is maintained within a temperature range at which the fabric will not be damaged. It has been found through experimentation that the temperature of the ironing surface at which different fabrics which are used to produce garments become overheated and cause undesired consequences such as shine or deformation of the fabric varies, whilst the temperature of the ironing surface at which creases may be removed when steam is dispensed to the fabric remains substantially constant. Therefore, as the ironing surface 32 is operated at a low temperature, whilst a high flow rate of steam is provided, it will be understood that it is not necessary for a user to select a different temperature setting dependent on the type of fabric to be steamed and/or pressed.

In the above arrangements, the heat transfer to the ironing surface 32 from the steam generator is dependent on the arrangement of the intermediate section, and the heater is controlled to maintain the temperature of the steam generator within one temperature range. However, it will be understood that the heat transfer rate is dependent on the temperature of the steam generator, as well as the thermal transmittance of the intermediate section. In another embodiment, the steam iron, acting as a garment steaming device, is provided with a motion sensor (not shown), acting as an operating condition sensor. The embodiment described herein is generally the same as the embodiments described above, and so a detailed description will be omitted. The motion sensor is arranged to detect motion of the steam iron. The controller determines movement of the steam iron in response to motion of the steam iron detected by the sensor. Therefore, the controller is able to determine whether the steam iron is in a moving condition or a stationary condition.

With such an arrangement, the controller is configured to operate the heater in dependence on the operating condition of the garment steaming device. The controller is configured to operate the heater to maintain the steam generator within a first temperature range when a first operating condition is determined and within a second temperature range when a second operating condition is determined. In the present embodiment, the first operating or motion condition is determined when the sensor detects that the steam iron is in a stationary condition. The second operating or motion condition is determined when the sensor detects that the steam iron is in a moving condition.

With such an arrangement it is possible to increase the operating temperature of the steam generator 20 when the garment steaming device is being moved and so is deemed to be actively pressing a fabric. The heat loss rate from the ironing surface 32 will increase when the ironing surface 32 is moved over a fabric and so the temperature of the steam generator 20 is able to be increased without exceeding the desired operating temperature of the ironing surface 32. Similarly, the heat loss rate from the ironing surface 32 is minimised when the garment steaming device is stationary on a fabric and so it is possible to decrease the operating temperature of the steam generator 20. This allows the temperature of the ironing surface 32 to be easily maintained below an upper temperature threshold.

For example, the controller may be configured to operate the heater 22 to maintain the steam generator 20 at a first temperature range of between 140° C. and 170° C. when it is determined that the garment steaming device is in a stationary condition, and to operate the heater 22 to maintain the steam generator 20 at a second temperature range of between 160° C. and 190° C. when it is determined that the garment steaming device is in a moving condition.

An advantage of varying the operating condition of the heater is that the heat loss from the ironing surface to a fabric is higher than when the ironing surface is moved over a fabric compared to when the ironing surface is stationary on a fabric. Therefore, it is possible to maximise the steam rate generated by the steam generator and to minimise or eliminate the occurrence of spitting and/or water leakage whilst still maintaining the temperature of the ironing surface below a desired operating temperature to prevent overheating of a fabric in contact with the ironing surface.

It will be understood that the flow rate of water into the generator may be controlled by the controller operating the valve in order to vary the steam flow rate produced.

Although in the above arrangement the operating condition sensor is a motion sensor, it will be understood that alternative sensing means may be used to detect whether the ironing surface is being moved over a fabric. In another embodiment, the intermediate layer is configured to have a variable thermal transmittance. Such an embodiment is generally the same as the above described embodiments and so a detailed description will be omitted herein. It will be understood that the alternative arrangements of the heating assembly for a steam iron as described above, and shown in FIGS. 1 to 3 may be used with this embodiment. However, in this embodiment the intermediate plate 51 is formed from a variable heat conductivity material. That is, the intermediate plate 51 is formed from a material configured to have a variable thermal transmittance dependent on the temperature of the intermediate plate 51. For example, Isoskin™ may be used to form the intermediate plate 51.

It will be understood that in the present application a material having a fixed thermal transmittance, such as the materials used for the intermediate layer in the above described embodiments, is a material which is typically able to vary by a small fraction, for example, less than 10% of their thermal transmittance over a temperature change of 40-50° C. It will be understood that in the present application a material having a variable thermal transmittance is a material which is able to vary its thermal transmittance by a substantial amount. That is, a material which is configured to vary its thermal transmittance by at least 50% over a change in temperature of 50° C.

In one embodiment the material is configured to vary its thermal transmittance by at least 100% over a change in temperature of 50° C.

In the present embodiment, the steam generator 20 is operated at a temperature between 165° C. and 235° C. This temperature range is provided to maximise the flow rate of steam that is produced by the steam generator when water is provided to the steam generator 20 through the water inlet 25.

In the present embodiments, the intermediate section 50 is configured to have a variable thermal transmittance so that, during use of the steam iron, heat transfer from the steam generator is controlled and the temperature of the ironing surface is maintained within the upper and lower threshold temperature values described above. That is, the range of the thermal transmittance of the intermediate section 50 controls the transfer of heat to the ironing surface so that the temperature of the ironing surface does not fall below a temperature at which condensation forms on a fabric, and does not exceed a temperature at which a fabric to be pressed becomes overheated and causing undesired consequences such as shine or deformation.

As described above, the thermal transmittance (h) of a section, such as a material, a composite material, or a combination of two or more materials is defined by the following equation:

$$h = \frac{Q}{A(T_{SG} - T_{IS})}$$

Wherein: h=thermal transmittance ($W/m^2K$)

Q=wheat transfer rate (W)

A=area of the ironing surface ($m^2$)

$T_{SG}$=temperature of the steam generator (° C.)

$T_{IS}$=temperature of the ironing surface (° C.)

Therefore, the thermal transmittance is dependent on the heat transfer rate, the area of the ironing surface and the temperature differential between the steam generator and the ironing surface. It will be understood that, during use, the temperature of the steam generator will be higher than the temperature of the ironing surface. The intermediate section 50 determines the transfer of heat from the steam generator 20 to the ironing surface 32. It will be understood that the heat transfer rate (W) of a variable heat conductivity material varies dependent on the temperature of the variable heat conductivity material. Therefore, a temperature gradient is provided between the steam generator 20 and the ironing surface 32. The intermediate section 50 also acts as an energy buffer.

With the provision of the intermediate section 50 it is possible to heat the steam generator 20 to a sufficient temperature to convert the water fed into the steam generator 20 into steam, whilst maintaining the ironing surface 32 within a predetermined temperature range. The intermediate section 50 allows the steam generator 20 to be heated to a sufficient temperature to allow a desired steam throughput from the steam generator 20, whilst maintaining the ironing surface 32 at a desired lower temperature.

In the present arrangement, the characteristics of the intermediate section 50 are configured to control the transfer of heat from the steam generator 20 to the ironing surface 32 so that the temperature of the ironing surface 32 is operated at a low ironing temperature at all times during use, that is at a temperature of less than 155° C., and preferably 145° C., and greater than 90° C., preferably 100° C., when the steam generator 20 is operated and heated at a temperature in the range of 165° C. and 235° C. It will be understood that, during use, the temperature of the steam generator will be higher than the temperature of the ironing surface.

The characteristics of the intermediate section 50 are configured to vary the thermal transmittance of the intermediate section 50 dependent on the temperature of the intermediate section 50. That is, the thermal transmittance characteristics of the intermediate plate 51 formed from a variable heat conductivity material are configured to vary dependent on the temperature of the intermediate pate 51.

In the present embodiment, the thermal transmittance of the intermediate plate 51, and therefore the intermediate section 50, is configured to vary so that the thermal transmittance of the intermediate section 50 is less than or equal to 36 $W/m^2K$ when the ironing surface temperature is 145° C.

The above parameters of the intermediate section 50 helps to ensure that the temperature of the ironing surface 32 does not exceed the upper threshold temperature of 155° C. when the temperature of the steam generator is between 165° C. and 235° C., irrespective of the operating condition of the ironing surface, and so will not damage a fabric.

In the present embodiment, the thermal transmittance of the intermediate plate 51, and therefore the intermediate section 50, is also configured to vary so that the thermal transmittance of the intermediate section 50 is greater than or equal to 42 $W/m^2K$ when the ironing surface temperature is 100° C.

The above parameters of the intermediate section 50 helps to ensure that the temperature of the ironing surface 32 does not drop lower than the lower threshold temperature of 90° C. when the temperature of the steam generator is between 165° C. and 235° C., irrespective of the operating condition of the ironing surface, and so will not allow condensation to form on a fabric during use.

Figure 5:
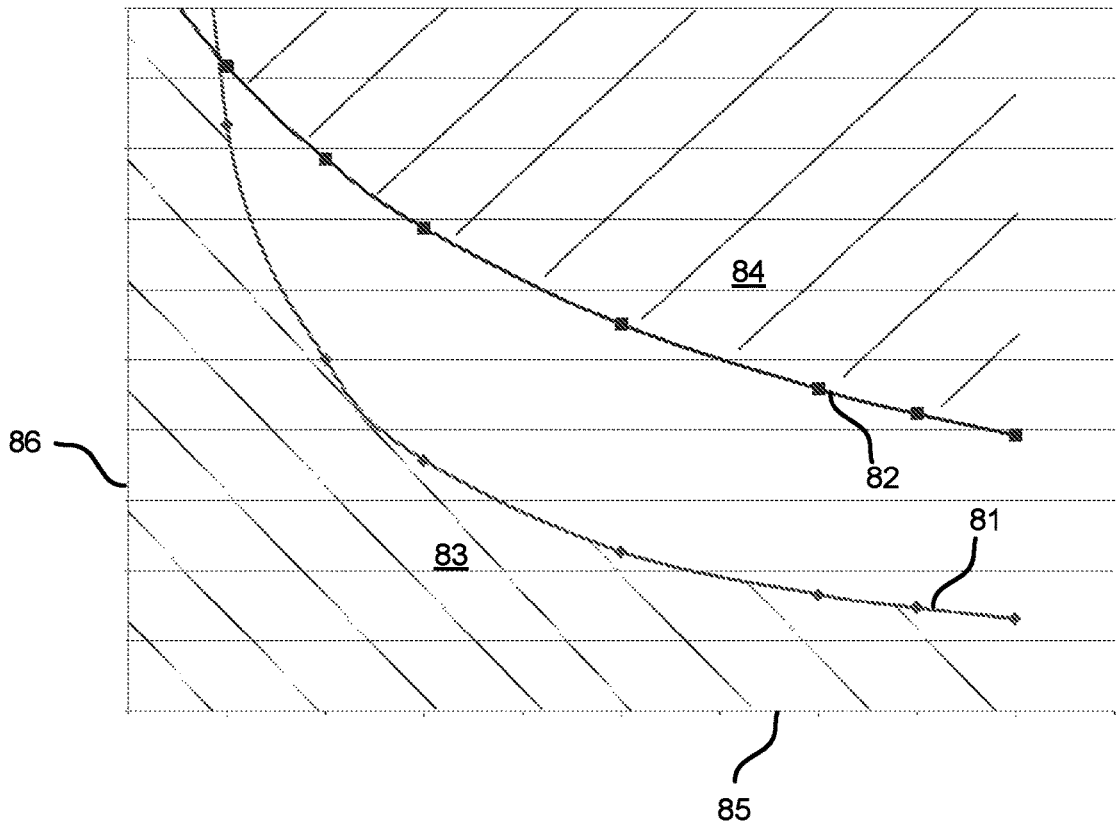
FIG. 5 shows a graph plotting an example of required thermal transmittance against operating temperature of the steam generator for two different temperatures of the ironing surface.

Referring to FIG. 5, a graph is shown plotting an example of desired thermal transmittance against operating temperature of the steam generator for two different temperatures of the ironing surface. In FIG. 5, the temperature of the steam generator is plotted along the x-axis 85, and the required thermal transmittance is plotted along the y-axis 86. The inventors have found that the required thermal transmittance of the intermediate plate 51, and therefore the intermediate section 50, should be equal to or above a predetermined value (as shown by line denoted 82) dependent on the temperature of the steam generator when the ironing surface temperature is at a lower temperature, for example 100° C., to lie in the area denoted 84, and that the required thermal transmittance of the intermediate plate 51, and therefore the intermediate section 50, should be equal to or below a predetermined value (as shown by line denoted 81) dependent on the temperature of the steam generator when the ironing surface temperature is at a higher temperature, for example 145° C., to lie in the area denoted 83.

It will be seen that for a certain temperature of the steam generator 20, the minimum required change in the thermal transmittance of the intermediate plate 51 is shown by the difference in thermal transmittance values between the lines denoted 81 and 82.

The intermediate section 50 as shown, for example, in FIG. 2 is configured to have a variable thermal transmittance so that, during use, the lowest heat transfer rate from the steam generator to the ironing surface occurs when the temperature of the ironing surface 32 is at the upper threshold temperature value and the ironing surface is disposed in a stationary condition.

Therefore, when the ironing surface is in a stationary condition against a fabric, the intermediate section 50 has the characteristic of:

$$h(T_{SG1}-145)\leq 1250\ W/m^2$$

Wherein: h=thermal transmittance ($W/m^2K$)

$T_{SG1}$=temperature of the steam generator (° C.)

That is, the product of the thermal transmittance of the intermediate section and the temperature differential between the steam generator and the ironing surface is less than or equal to 1250 $W/m^2$ when the temperature of the ironing surface is 145° C. and the ironing surface is located against a fabric in the stationary condition.

The above parameters of the intermediate section 50 helps to ensure that the temperature of the ironing surface 32 does not exceed the upper threshold temperature, irrespective of the operating condition of the ironing surface, and so will not damage a fabric.

The intermediate section 50 is also configured to have a variable thermal transmittance so that, during use, the highest heat transfer rate from the steam generator to the ironing surface occurs when the temperature of the ironing surface 32 is at the lower threshold temperature value and the ironing surface is disposed in a moving condition.

Therefore, when the ironing surface is in a moving condition against a fabric, the intermediate section 50 has the characteristic of:

$$h(T_{SG2}-100)\geq 5500\ W/m^2$$

Wherein: h=thermal transmittance ($W/m^2K$)

$T_{SG2}$=temperature of the steam generator (° C.)

That is, the product of the thermal transmittance of the intermediate section and the temperature differential between the steam generator and the ironing surface is greater than or equal to 5500 $W/m^2$ when the temperature of the ironing surface is 100° C. and the ironing surface is located against a fabric in the moving condition.

The above parameters of the intermediate section 50 helps to ensure that the temperature of the ironing surface 32 does not drop lower than the lower threshold temperature, irrespective of the operating condition of the ironing surface, and so will not allow condensation to form on a fabric during use.

The steam generator temperature values ($T_{SG1}$ and $T_{SG2}$), as well as the thermal transmittance, h, of the intermediate section are dependent on the two inequalities discussed above. Therefore, the values of thermal transmittance of the intermediate section and the temperature ranges for operating the steam generator are determined through experimentation by reference to the inequalities given above for the ironing surface in a stationary condition against a fabric and the ironing surface in a moving condition against a fabric.

It will be understood that the temperature of the steam generator may vary, in particular between when the ironing surface is in each of a stationary and a moving condition against a fabric. Therefore, $T_{SG1}$ may not equal $T_{SG2}$.

The variable thermal transmittance of the intermediate section 50 ensures that the temperature of the steam generator 20 is maintained within its predetermined operating temperature range to ensure that a desired quantity of supply of steam is provided to the fabric. The variable thermal transmittance intermediate section 50 also ensures that when a desired flow rate of water is provided to the steam generator 20 to produce a desired steam flow rate, all the water is turned into steam without water passing through the steam outlet 26. If a quantity of water is not turned into steam, then the water may flow from the steam iron and act to dampen the fabric being pressed.

It has been found from experimentation that the combination of providing the ironing surface within the above described operating range together with providing a high steam flow rate, which is made possible by maintaining the temperature of the steam generator provides a good ironing performance for fabrics of garments.

As mentioned above, the intermediate section 50 acts as a heat distribution layer. That is, the intermediate section 50 acts to distribute a portion of the heat generated by the heater 22 of the steam generator 20 to the ironing surface 32 so that the ironing surface 32 is heated to a desired temperature range. Therefore, it is possible to use a single heater to heat both the steam generator 20 to produce steam and to heat the ironing surface 32. Furthermore, the intermediate section 50 is also provided to distribute heat evenly across the ironing surface 32 to prevent localised hot spots on the ironing surface 32. That is, the intermediate section 50 provides an even heat distribution.

The provision of the intermediate section 50 may also limit heat loss from the steam generator 20 when heat is transferred from the ironing surface 32 to the fabric of a garment being ironed. Therefore, a reduction of temperature in the steam generator 20 is restricted.

It will be understood that one arrangement of the intermediate section 50 which provides the desired characteristics is described above. With such an intermediate section 50 the parameters, such as the dimensions, of the intermediate section 50 are dependent on the characteristics of the ironing surface 32 and the steam generator 20, for example the size of the ironing surface 32, the steam generator 20, the contact area between the intermediate section 50 and the steam generator 20 and the contact area with the ironing plate 30. However, it will be understood that the parameters of the intermediate section may be easily determined in order to provide the desired characteristics of the intermediate section.

In the present arrangement, the intermediate section 50 extends across the footprint of the steam generator 20. In such an arrangement the steam path 57 from the steam generator to the ironing surface is formed through the intermediate section 50. However, in an alternative arrangement the intermediate section 50 may only partially extend across the footprint of the steam generator 20. In such an arrangement, the intermediate section does not extend across the footprint of the ironing surface 32. A steam path is provided around the intermediate section to allow steam to pass from the steam generator 20 to the ironing surface 32.

In the above described embodiments, the intermediate section 50 is formed by the intermediate plate 51 together with the air gap 55 forming first and second intermediate layers respectively. However, in an alternative embodiment, the air gap is omitted. With such an arrangement, the intermediate plate 51 forms the intermediate section. One or more steam openings are formed through the intermediate plate 51 to form a steam path from the steam generator 20 to the steam holes 34 in the ironing surface 32. Alternatively, a steam path is provided around the intermediate plate 51 to allow steam to pass from the steam generator 20 to the steam holes 34 extending through the ironing surface 32.

It will be understood that the intermediate section may be formed from two or more intermediate layers, such as a layer having a variable thermal transmittance and a layer having a fixed thermal transmittance.

It will be understood that in the present application a material having a fixed thermal transmittance is a material which is typically able to vary by a small fraction, for example, less than 10% of their thermal transmittance over a temperature change of 40-50° C. It will be understood that in the present application a material having a variable thermal transmittance is a material which is able to vary its thermal transmittance by a substantial amount. That is, a material which is configured to vary its thermal transmittance by at least 50% over a change in temperature of 50° C.

In one embodiment the material is configured to vary its thermal transmittance by at least 100% over a change in temperature of 50° C.

In an alternative arrangement, the intermediate plate, acting as a first intermediate layer, defines a cavity in which a phase-change material is received to act as a second intermediate layer.

It will also be understood that the intermediate section disposed between the steam generator and the ironing plate may comprise more than two intermediate layers to obtain the desired temperature gradient between the steam generator and the ironing surface.

In an alternative arrangement, an air gap, forming an intermediate layer of the intermediate section may be formed on the upper side of the intermediate plate 51. With such an arrangement, the lower face 53 of the intermediate plate 51 is mounted to the ironing plate 30 and the shoulder 56 mounts against the lower side 28 of the steam generator 20.

The arrangement of the heating assembly 60 of a steam iron described above with reference to FIG. 3, may include an intermediate section comprising a variable heat conductivity material acting as an intermediate layer 61. Such an arrangement is generally the same as the embodiment described above with reference to FIG. 3, and so a detailed description will be omitted. However, in this embodiment an intermediate section comprises a sheet of variable heat conductivity material acting as an intermediate layer 61 provided between the lower side 28 of the steam generator 20 and the upper surface 33 of the ironing plate 30. In such an arrangement, the openings forming the steam outlets 26 of the steam generator 20 are aligned with the steam holes 34 in the ironing surface 32.

In the above described embodiments, it will be understood that the heater 22 is operated in one operating condition to maintain the temperature of the steam generator 20 within a predetermined temperature range. With this arrangement, the temperature of the steam generator 20 is not user controllable, which simplifies operation of the steam iron. Furthermore, it is not necessary for a user to adjust the temperature of the ironing surface dependent on the fabric to be ironed because the ironing surface is maintained within a temperature range at which the fabric will not be damaged. It has been found through experimentation that the temperature of the ironing surface at which different fabrics which are used to produce garments become overheated and cause undesired consequences such as shine or deformation of the fabric varies, whilst the temperature of the ironing surface at which creases may be removed when steam is dispensed to the fabric remains substantially constant. Therefore, as the ironing surface 32 is operated at a low temperature, whilst a high flow rate of steam is provided, it will be understood that it is not necessary for a user to select a different temperature setting dependent on the type of fabric to be steamed and/or pressed.

In the above arrangements, the heat transfer to the ironing surface 32 from the steam generator is dependent on the arrangement of the intermediate section, and the heater is controlled to maintain the temperature of the steam generator within one temperature range. However, it will be understood that the heat transfer rate is dependent on the temperature of the steam generator, as well as the variable thermal transmittance of the intermediate section.

Figure 4:
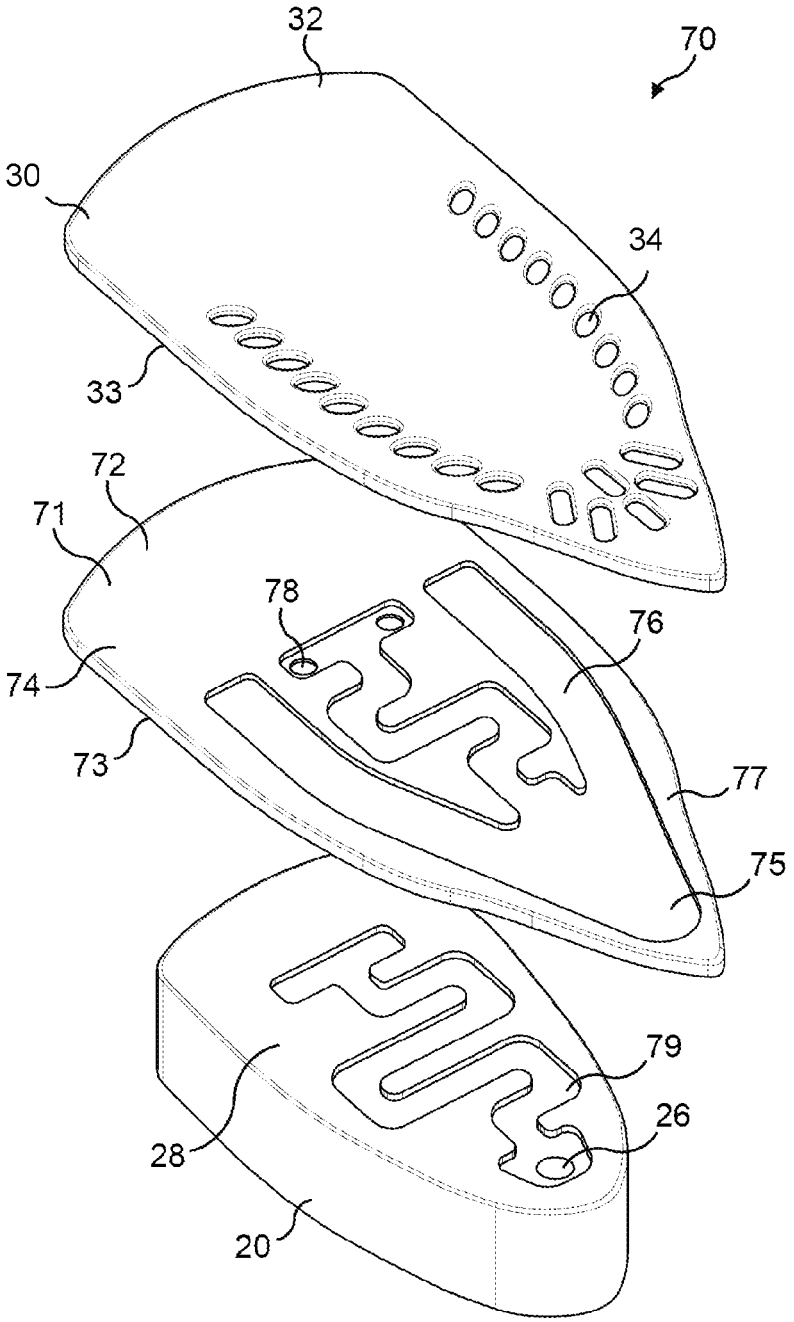
FIG. 4 shows an exploded perspective view of another embodiment of a heating assembly for a steam iron having a steam channel formed therein.

Referring to FIG. 4, another embodiment of a heating assembly 70 of a steam iron is shown. The heating assembly 70 shown in FIG. 4 generally has the same arrangement as the heating assembly 10 described above with reference to FIG. 1 and FIG. 2. Therefore, a detailed description will be omitted herein. Features and components that correspond to features and components described above will retain the same reference numerals.

The heating assembly 70 has an intermediate section 71. The intermediate section 71 is formed by an intermediate layer, such as an intermediate plate 72. The intermediate plate 72 is received between the steam generator 20 and the ironing plate 30. The intermediate plate 72 is disposed between the lower side 28 of the steam generator 20 and the upper surface 33 of the ironing plate 30. The intermediate section 71 may be formed of two or more intermediate layers (not shown). The intermediate section 71 is configured to act as a thermal buffer to store heat from the steam generator.

The intermediate section 71 is also configured to act as a heat distributor to distribute heat to the ironing surface 32.

The intermediate plate 72 has an upper face 73 and a lower face 74. The intermediate plate 72 is formed from a heat conductive material such as a metal, a metal alloy and/or a thermally conductive polymer. The intermediate plate 72 may be formed from a variable heat conductive material, for example IsoSkin™. The upper and lower faces 73, 74 are generally planar and define a panel section 77 therebetween. The intermediate section 71 has a first steam channel 75 formed in its lower face 74. The first steam channel 75 is disposed to allow steam from the steam generator 20 to flow along it. The first steam channel 75 extends along the lower face 74 of the intermediate plate 72. The first steam channel 75 has a base 76 and sidewalls upstanding from the base 76.

The first steam channel 75 provides a pathway to guide steam along the intermediate section 71. Therefore, the surface area of the intermediate section 71 in contact with steam flowing from the steam generator 20 is maximised. As a result, the rate of increase in temperature of the intermediate plate 72 is maximised when steam flows along the first steam channel 75.

The lower face 74 of the intermediate plate 72 locates against the upper surface 33 of the ironing plate 30. The upper surface 33 of the ironing plate 30 forms a face of the first steam channel 75. Therefore, the surface area of the ironing plate 30 in contact with steam flowing from the steam generator 20 is maximised. As a result, heat transfer to the ironing surface 32 is maximised and the rate of increase in temperature of the ironing surface 32 is maximised when steam flows along the first steam channel 75. Therefore, the ironing surface 32 is able to be heated to its operating temperature range at an increased rate.

The first steam channel 75 is formed to extend over the steam holes 34 formed in the ironing surface 32 so that steam from the steam generator 20 is fed to the steam holes 34.

The first steam channel 75 forms part of a steam path formed by the intermediate section 71. The steam path also comprises steam openings 78 formed through the intermediate plate 72. The steam openings 78 communicate with the first steam channel 75. Alternatively, a single steam opening may be provided.

A second steam channel 79 is formed in the lower side 28 of the steam generator 20. The second steam channel 79 extends along the lower side 28 of the steam generator 20. The upper face 73 of the intermediate plate 72 defines a surface of the second steam channel 79. Alternatively, the second steam channel 79 is formed in the upper face 73 of intermediate plate 72. It will also be understood that steam channels may be formed in both the lower side 28 of the steam generator 20 and the upper face 73 of intermediate plate 72. The steam openings 78 communicate with the second steam channel 79. The steam outlet 26 of the steam generator 20 communicates with the second steam channel 79. The second steam channel 79 forms part of a steam path formed by the intermediate section 71.

The surface area of the intermediate plate 72 in contact with steam flowing from the intermediate plate 72 is maximised. As a result, the rate of increase in temperature of the intermediate plate 72 is maximised when steam flows along the second steam channel 79. Heat is transferred from the steam generator 20 to the intermediate section 71 by conduction, i.e. contact regions, and by convection, i.e. via steam flow along the channels 75, 79. The intermediate plate 72 transfers heat to the ironing surface 32 by conduction, i.e. through contact regions, and convection, i.e. via steam flow along the channels 75, 79. During ironing, heat is rapidly dissipated from the ironing surface 32 to the fabric and consequently, its temperature falls. Temperature of the ironing surface 32 is increased by conduction, however heat transfer by steam convection maximises the temperature increase. Potential condensation on the fabric is therefore avoided by augmenting heat transfer via steam channeling about the intermediate plate 72. Furthermore, by increasing the steam path length, any water drops ejected from the steam generator during steaming also gets evaporated in the steam channels, thus avoiding water marks on the fabric. The intermediate plate 72, acting as a heat distribution plate helps to spread the heat uniformly over the ironing surface 32. So the uniformity of the temperature distribution across the ironing surface is maximised.

Furthermore, channeling steam about the intermediate section 71 minimises water leakage from the steam iron because any condensate or supplied water that has not been converted to steam in the steam generator 20 is heated up and converts to steam as it passes along the first and second steam channels 75, 79 provided.

The second steam channel may be formed in an upper face of the intermediate section. With this arrangement, the second steam channel is exposed to a face of the steam generator. Therefore, heat transfer to fluid in the steam channel is maximised. With the embodiments described above with reference to FIG. 4, the operation condition of the steam generator may also be varied in dependence on the operating condition of the steam iron. However, it will be understood that the operating temperature of the ironing surface is not user selectable during use.

With the arrangements described herein, it will be understood that it is possible to provide a suitable temperature at the ironing surface, together with a sufficient flow rate, to allow a user to iron a wide range of fabrics without the need to adjust the temperature of the iron. Therefore, the need for a user to adjust and select a suitable setting for the steam iron is removed.

It will also be understood that with the above arrangement it is possible for a single heater to be provided to heat the steam generator and the ironing surface to different temperatures. Therefore, the need to provide two heaters to heat the steam generator and the ironing surface to different temperatures is removed. This minimises the weight, size and cost of the steam iron.

With the embodiments described above the water receiving chamber (not shown) is received in the housing. However, it will be understood that in an alternative arrangement the water receiving chamber (not shown) is disposed in a base unit spaced from the housing. With such an arrangement the water receiving chamber (not shown) is in fluid connection with the fluid inlet of a steam generating chamber via a flexible hose or the like. This minimises the weight of the steam iron as the weight of the water stored in the water receiving chamber is transferred to a base unit and is not disposed in the iron. The water is delivered from the water receiving chamber to the steam generating chamber by a fluid pump. Such an arrangement is also applicable to other garment steaming devices such as a steamer.

It will be appreciated that the term "comprising" does not exclude other elements or steps and that the indefinite article "a" or "an" does not exclude a plurality. A single processor may fulfil the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. A garment steaming device comprising a steam generator having a heater, an ironing surface against which a fabric of a garment is locatable, and an intermediate section *configured to have a thermal transmittance and* disposed between the steam generator and the ironing surface to transfer heat from the steam generator to the ironing surface so that the ironing surface is indirectly heated by the steam generator via the intermediate section, wherein the [operating temperature of the ironing surface is not user selectable during use and the intermediate section is configured to have a] thermal transmittance[that], during use, controls the heat transfer from the steam generator to the ironing surface to maintain [the] *an operating* temperature of the ironing surface between 90° C. and 155° C.[when the ironing surface is located against a fabric in each of a stationary condition and a moving condition relative to the fabric], wherein the intermediate section is further configured to have at least one selected from the group consisting of (i) a fixed thermal transmittance between 75 $W/m^2K$ and 125 $W/m^2K$ and (ii) a variable thermal transmittance of a variable heat conductivity material, wherein the variable heat conductivity material is configured to vary its thermal transmittance by at least 100% over a change in temperature of the variable heat conductivity material of 50° C.

2. A garment steaming device according to claim 1, wherein the product of the thermal transmittance of the intermediate section and [the] *a* temperature differential between the steam generator and the ironing surface is less than or equal to 1250 $W/m^2$ when the temperature of the ironing surface is 145° C. and the ironing surface is located against a fabric in [the] *a* stationary condition.

3. A garment steaming device according to claim 1, wherein the product of the thermal transmittance of the intermediate section and [the] *a* temperature differential between the steam generator and the ironing surface is greater than or equal to 5500 $W/m^2$ when the temperature of the ironing surface is 100° C. and the ironing surface is located against a fabric in [the] *a* moving condition.

4. A garment steaming device according to claim 1, wherein the steam generator is configured to generate steam at a rate *selected from the group consisting* of (*i*) greater than or equal to 20g/min, and [more preferably] (*ii*) greater than or equal to 30g/min.

5. A garment steaming device according to claim 1, further wherein the [fixed] thermal transmittance [is] *comprises a fixed thermal transmittance in a range* between 90 $W/m^2K$ and 110 $W/m^2K$.

6. A garment steaming device according to claim 1, wherein the steam generator is configured to operate at a temperature between 140° C. and 170° C.

7. A garment steaming device according to claim 1, wherein the [intermediate section is configured to have the] *thermal transmittance comprises a* variable thermal transmittance.

8. A garment steaming device according to claim 7, wherein the intermediate section comprises [the] variable heat conductivity material.

9. A garment steaming device according to claim 8, wherein the intermediate section is formed from a layer of variable heat conductivity material.

10. A garment steaming device according to claim 8, wherein the thermal transmittance of the variable heat conductivity material is configured to vary by at least 100% when the ironing surface temperature changes between 100° C. and 145° C.

11. A garment steaming device according to claim 7, wherein the steam generator is configured to operate at a temperature of greater than or equal to 160° C.

12. A garment steaming device according to claim 7, wherein the steam generator is configured to operate at a temperature of less than or equal to 250° C.

13. A garment steaming device according to claim 7, wherein the thermal transmittance of the intermediate section is configured to be less than or equal to 36 $W/m^2K$ when the ironing surface temperature is 145° C.

14. A garment steaming device according to claim 7, wherein the thermal transmittance of the intermediate section is configured to be greater than or equal to 42 $W/m^2K$ when the ironing surface temperature is 100° C.

15. A garment steaming device according to claim 1, wherein at least part of the intermediate section is integrally formed with one or more of the steam generator and the ironing surface.

16. A garment steaming device according to claim 1, wherein the intermediate section comprises an intermediate layer configured to act as one or more of a thermal buffer to store heat from the steam generator and a heat distributor to distribute heat to the ironing surface.

17. A garment steaming device according to claim 1, wherein the intermediate section comprises an intermediate plate received between the steam generator and the ironing surface.

18. A garment steaming device comprising a steam generator having a heater, a motion sensor configured to detect the operating condition of the garment steaming device, an ironing surface, and a controller, wherein the controller is configured to operate the heater to maintain the steam generator at a first temperature range when no motion of the garment steaming device is detected by the motion sensor and the ironing surface is located against a fabric, and at a second temperature range when motion of the garment steaming device is detected by the motion sensor and the ironing surface is located against a fabric, further comprising [and] an intermediate section disposed between the steam generator and the ironing surface to transfer heat from the steam generator to the ironing surface so that the ironing surface is indirectly heated by the steam generator via the intermediate section, wherein the intermediate section is configured to have at least one selected from the group consisting of (i) a fixed thermal transmittance between 75 $W/m^2K$ and 125 $W/m^2K$ and (ii) a variable thermal transmittance of a variable heat conductivity material, wherein the variable heat conductivity material is configured to vary its thermal transmittance by at least 100% over a change in temperature of the variable heat conductivity material of 50° C.

19. A method of operating a garment steaming device having a steam generator with a heater, an ironing surface, and a motion sensor configured to detect the operating condition of the garment steaming device, the method comprising operating the heater to maintain the steam generator at a first temperature range when no motion of the garment steaming device is detected by the motion sensor and the ironing surface is located against a fabric, and operating the heater to maintain the steam generator at a second temperature range when motion of the garment steaming device is detected by the motion sensor and the ironing surface is located against a fabric, wherein an intermediate section is disposed between the steam generator and the ironing surface to transfer heat from the steam generator to the ironing surface so that the ironing surface is indirectly heated by the steam generator via the intermediate section, wherein the intermediate section is configured to have at least one selected from the group consisting of (i) a fixed thermal transmittance between 75 $W/m^2K$ and 125 $W/m^2K$ and (ii) a variable thermal transmittance of a variable heat conductivity material, wherein the variable heat conductivity material is configured to vary its thermal transmittance by at least 100% over a change in temperature of the variable heat conductivity material of 50° C.

20. A garment steaming device according to claim 1, wherein the steam generator is configured to operate at a temperature between 150° C. and 160° C.

21. A garment steaming device according to claim 16, wherein the intermediate layer comprises a steam channel extending along the intermediate layer along which steam from the steam generator is able to flow.

*22. A garment steaming device according to claim 1, wherein the operating temperature of the ironing surface is not user selectable during use.*

*23. A garment steaming device according to claim 1, wherein the intermediate section further comprises a first intermediate layer made of a heat conductive metal material.*

*24. A garment steaming device according to claim 1, further comprising a motion sensor configured to detect an operating condition of the garment steaming device, and a controller, wherein the controller is configured to operate the heater to maintain the steam generator at a first temperature range when no motion of the garment steaming device is detected by the motion sensor and the ironing surface is located against a fabric, and at a second temperature range when motion of the garment steaming device is detected by the motion sensor and the ironing surface is located against a fabric.*

*25. A method of operating a garment steaming device having a steam generator with a heater, and an ironing surface, and a sensor configured to detect an operating condition of the garment steaming device, the method comprising operating the heater to maintain the steam generator at a first temperature range when a first operating condition of the garment steaming device is detected by the sensor and the ironing surface is located against a fabric, and operating the heater to maintain the steam generator at a second temperature range when a second operating condition of the garment steaming device is detected by the sensor and the ironing surface is located against a fabric, wherein an intermediate section is configured to have a thermal transmittance and disposed between the steam generator and the ironing surface to transfer heat from the steam generator to the ironing surface so that the ironing surface is indirectly heated by the steam generator via the intermediate section, wherein the thermal transmittance, during use, controls the heat transfer from the steam generator to the ironing surface to maintain an operating temperature of the ironing surface in a range between 90° C. and 155° C., and wherein the thermal transmittance comprises at least one selected from the group consisting of (i) a fixed thermal transmittance between 75 $W/m^2K$ and 125 $W/m^2K$ and (ii) a variable thermal transmittance of a variable heat conductivity material, wherein the variable heat conductivity material is configured to vary its thermal transmittance by at least 100% over a change in temperature of the variable heat conductivity material of 50° C.*

*26. A method of operating a garment steaming device according to claim 25, wherein the sensor comprises a motion sensor, the first operating condition comprises when no motion of the garment steaming device is detected by the motion sensor, and the second operating condition comprises when motion of the garment steaming device is detected by the motion sensor.*

* * * * *